US00RE38591E1

(19) United States
(12) Reissued Patent
Kellogg et al.

(10) Patent Number: US RE38,591 E
(45) Date of Reissued Patent: Sep. 21, 2004

(54) COLLAPSIBLE DRYING APPARATUS AND METHOD FOR FORMING AND COLLAPSING SAID APPARATUS

(75) Inventors: Michael S. Kellogg, Oconomowoc, WI (US); Dean B. Krotts, Milwaukee, WI (US)

(73) Assignee: Bajer Design & Marketing, Inc., Pewaukee, WI (US)

(21) Appl. No.: 09/574,757

(22) Filed: May 18, 2000

Related U.S. Patent Documents

Reissue of:
(64) Patent No.: 5,992,045
Issued: Nov. 30, 1999
Appl. No.: 09/036,306
Filed: Mar. 6, 1998

(51) Int. Cl.[7] ..... F26B 25/00
(52) U.S. Cl. ..... 34/442; 34/103; 34/619; 34/237; 34/239; 160/370.21
(58) Field of Search ..... 34/442, 91, 103, 34/619, 237, 239; 160/370.21, 351, 329, 370.22; 296/97.7, 97.8

(56) References Cited

U.S. PATENT DOCUMENTS

| | | | | | |
|---|---|---|---|---|---|
| 216,227 | A | | 6/1879 | Sedgwick | 220/9.2 |
| 338,892 | A | | 3/1886 | Walker | 220/9.3 |
| 344,340 | A | | 6/1886 | Barrow | 383/33 |
| 356,301 | A | | 1/1887 | Belknap | 220/9.3 |
| 1,135,892 | A | | 4/1915 | Grosenbeck | 220/9.3 |
| 1,155,475 | A | | 10/1915 | Fay | 220/9.3 |
| 1,167,497 | A | | 1/1916 | Hayes | |
| 1,180,574 | A | | 4/1916 | Despot | 220/9.3 |
| 1,538,260 | A | | 5/1925 | Street et al. | 220/493 |
| 1,581,888 | A | | 4/1926 | Thomas | 222/572 |
| 1,691,904 | A | | 11/1928 | Gamble | 206/8 |
| 1,979,978 | A | | 11/1934 | Martin | 190/115 |
| 1,994,235 | A | | 3/1935 | Solomon | 383/33 |
| 1,999,424 | A | | 4/1935 | Seitz | 190/119 |
| 2,182,932 | A | | 12/1939 | Sanford | 220/9.2 |
| 2,269,574 | A | | 1/1942 | Benenfeld | 190/126 |
| 2,298,786 | A | | 10/1942 | Dubofsky et al. | 220/9.3 |
| 2,575,893 | A | | 11/1951 | Seaman | 383/25 |
| 2,625,973 | A | | 1/1953 | Weldon et al. | 206/459.5 |
| 2,710,084 | A | | 6/1955 | Braverman | 190/107 |
| 2,714,978 | A | * | 8/1955 | Smith | 34/237 |
| 2,746,582 | A | | 5/1956 | Cart | 190/115 |
| 2,778,560 | A | | 1/1957 | Pfeiffer | 220/9.2 |
| 3,233,644 | A | | 2/1966 | Bono | 220/9.1 |
| 3,336,969 | A | * | 8/1967 | Marchman | 160/370.21 |
| 3,373,925 | A | | 3/1968 | Gatward | 383/20 |
| 3,675,667 | A | | 7/1972 | Miller | 135/126 |
| 3,696,850 | A | | 10/1972 | Roenblum | 190/108 |
| 3,960,161 | A | | 6/1976 | Norman | 135/126 |
| 3,990,463 | A | | 11/1976 | Norman | 135/126 |
| 4,055,239 | A | | 10/1977 | Weiner | 190/126 |
| 4,538,365 | A | * | 9/1985 | Aho | 34/239 |
| 4,642,934 | A | | 2/1987 | Carlson et al. | |
| 4,697,357 | A | * | 10/1987 | Van Vliet | 34/611 |
| 4,784,248 | A | | 11/1988 | Workman | 190/126 |
| 4,813,520 | A | | 3/1989 | Lin | 190/107 |
| 4,815,784 | A | * | 3/1989 | Zheng | 296/97.7 |
| 4,825,892 | A | | 5/1989 | Norman | 135/126 |
| 4,858,634 | A | | 8/1989 | McLeese | 135/126 |
| 4,862,602 | A | * | 9/1989 | Krill | 34/239 |
| 4,895,230 | A | | 1/1990 | King | 190/107 |
| 4,951,333 | A | | 8/1990 | Kaiser et al. | 5/417 |

(List continued on next page.)

*Primary Examiner*—Pamela Wilson
(74) *Attorney, Agent, or Firm*—Ryan Kromholz & Manion, S.C.

(57) ABSTRACT

A collapsible drying apparatus and method for forming and collapsing such apparatus, said apparatus comprising a frame having an expanded state and a collapsed state, a web substantially stretched over the frame, at least one support member coupled to the frame, and a strap having its ends coupled to the web, including a releasable fastener located a predetermined distance from one of the ends of the strap, and having adjustable length to apply a corresponding tension to the frame and the web, biasing the apparatus into a convexly accurate condition.

14 Claims, 2 Drawing Sheets

U.S. PATENT DOCUMENTS

| | | | | | |
|---|---|---|---|---|---|
| 4,995,487 | A | | 2/1991 | Plath | 190/18 A |
| D315,432 | S | * | 3/1991 | Smith | D32/58 |
| 5,009,189 | A | | 4/1991 | Neff | 119/200 |
| 5,024,262 | A | * | 6/1991 | Huang | 160/370.2 |
| 5,035,460 | A | * | 7/1991 | Huang | 296/95.1 |
| 5,038,812 | A | | 8/1991 | Norman | 135/126 |
| 5,072,828 | A | | 12/1991 | Irvine | 220/4.33 |
| 5,090,588 | A | | 2/1992 | Van Romer et al. | 220/573 |
| 5,116,138 | A | | 5/1992 | Macsenti et al. | 383/33 |
| 5,213,147 | A | * | 5/1993 | Zheng | 160/370.2 |
| 5,024,262 | A | * | 7/1994 | Huang | 160/370.2 |
| 5,358,440 | A | | 10/1994 | Zheng | 446/48 |
| 5,560,385 | A | | 10/1996 | Zheng | 135/125 |
| 5,664,596 | A | | 9/1997 | Zheng | 135/126 |
| 5,664,886 | A | | 9/1997 | Hutchinson | 383/4 |
| 5,671,479 | A | * | 9/1997 | Dedrick | 2/46 |
| 5,800,067 | A | | 9/1998 | Easter | 383/104 |
| 5,816,279 | A | | 10/1998 | Zheng | 135/126 |
| 5,845,697 | A | * | 12/1998 | Zheng | 160/370.21 |
| D406,423 | S | | 3/1999 | Kellogg et al. | D32/37 |
| 5,901,926 | A | | 5/1999 | Zheng | 244/153 R |
| 5,910,038 | A | | 6/1999 | Zheng | 446/114 |
| 5,910,058 | A | | 6/1999 | Zheng | 473/481 |
| 5,927,793 | A | * | 7/1999 | McGrath, Jr. | 296/136 |
| 5,938,496 | A | | 8/1999 | Zheng | 446/106 |
| 5,941,265 | A | | 8/1999 | Zheng | 135/125 |
| 5,975,101 | A | | 11/1999 | Zheng | 135/125 |
| 6,006,772 | A | | 12/1999 | Zheng | 135/126 |

* cited by examiner

COLLAPSIBLE DRYING APPARATUS AND METHOD FOR FORMING AND COLLAPSING SAID APPARATUS

Matter enclosed in heavy brackets [ ] appears in the original patent but forms no part of this reissue specification; matter printed in italics indicates the additions made by reissue.

BACKGROUND OF THE INVENTION

The present invention relates generally to household products and specifically to a collapsible drying apparatus for convenient drying, storage, and transportation. The need for this invention arises in typical households. It is particularly difficult to dry certain garments used in the household, especially those made out of heavy fabrics, such as wool. Such garments must be laid on a smooth surface and air-dried over a period of time.

Several prior art devises have attempted to provide solutions to this problem. However, none provide the convenient, economical, and easy to use features of the present invention. For example, U.S. Pat. No. 5,213,147 to Zheng discloses a method and apparatus for folding and collapsing an object incorporating a flexible loop. The need for a cable having it ends passing through an opening and then tied to second and third points along the loop restricts the use of the object in the drying process. Furthermore, the invention does not allow both sides of the garment to be freely exposed to air movement. U.S. Pat. No. 4,862,602 to Krill teaches a collapsible drying rack including a series of horizontal tubular plastic frame elements connected together by corner elements and a mesh sheet mounted on the frame. However, taking apart such a device appears to be a laborious process and storing it is a challenge in relatively narrow place, such as traveler's bag. Reliability may be a problem also, because plastic elements tend to break easily.

U.S. Pat. No. 4,697,357 to Van Vliet discloses a clothes-drying platform composed of a net stretched between frame members knitted through the margins of the net. The platform can be supported alternatively by swingable, retractable legs, by suction cups, or by a suspension sling. The platform is not foldable and, therefore, is harder to transport or to store.

It is an object of this invention to provide a collapsible drying apparatus that is easy to set up, easy to fold into a compact configuration, and to be conveniently stored and transported. It is a further object of this invention to provide such an apparatus that can be sturdily supported in a convexly arcuate position so that air can freely circulate above and below the object or garment to be dried. Another object of this invention is to provide a method for forming and collapsing a drying apparatus that is effortless and involves a minimal number of steps.

SUMMARY OF THE INVENTION

In order to accomplish the objects of the present invention, the preferred embodiment of the collapsible drying apparatus comprises a frame having an expanded state and a collapsed state and a web substantially stretched over the frame. In it preferred embodiment, two opposing support members are coupled to the frame. A strap having it ends coupled to the web comprises a releasable fastener located a predetermined distance from one of the strap's ends. The ends of the strap may also be coupled to the frame. The strap has an adjustable length and applies a variable tension to the frame in it expanded state and also to the web. As a result of the applied variable tension, the web and the frame take a convexly arcuate position that allows support of the garment or other article for drying and air movement.

In order to fold the apparatus into its collapsed state, the user needs to disengage the fastener, thereby releasing the tension applied to the web and to the frame. Then, the user rotates the support members or opposed sides of the frames in opposite directions in planes perpendicular to a plane defined by the frame and the web, and then biases the support members or sides toward each other. These actions force the frame to collapse by creating a pair of circular web portions folded adjacently. Finally, the user wraps the strap around the frame and the two web portions and engages the fastener, thereby securing the frame in its collapsed state.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
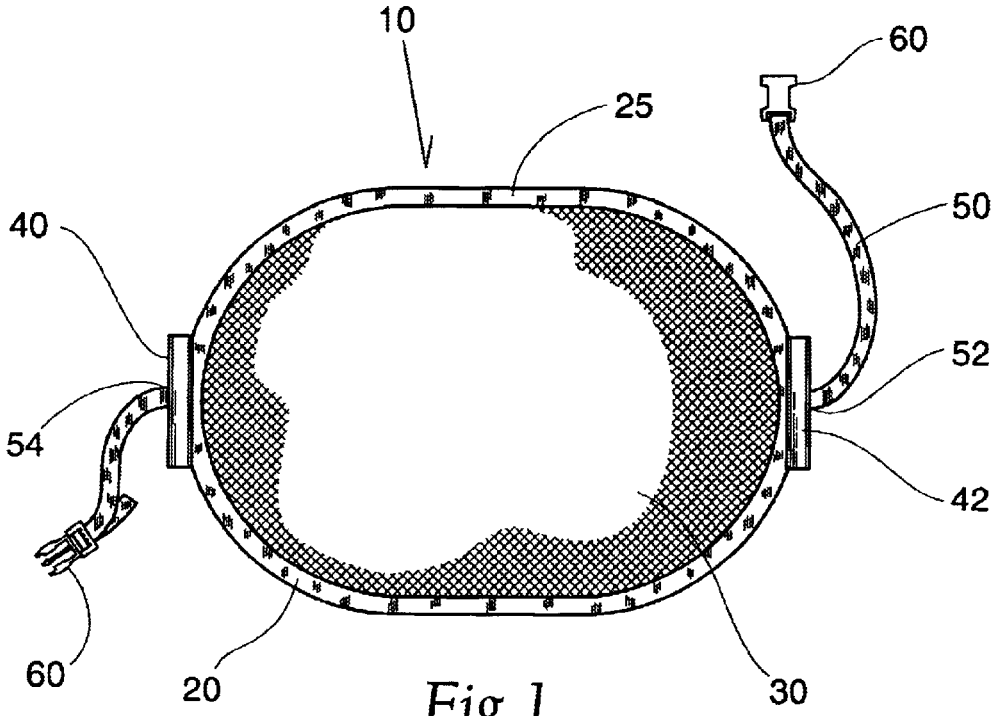
FIG. 1 is a top view of the invention, showing the frame in its expanded state.

The preferred embodiment of the present invention, the collapsible drying apparatus 10, is illustrated in FIG. 1.

Figure 2:
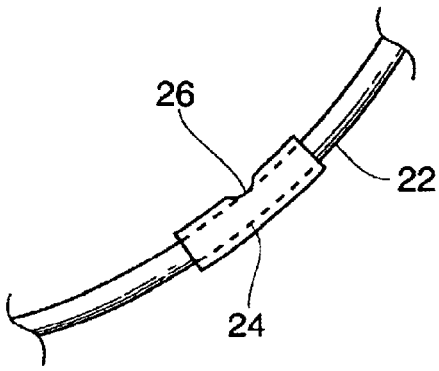
FIG. 2 is an enlarged detailed view of the frame, showing the crimped roll pin connecting the ends of the frame.

As shown in FIG. 1, the apparatus 10 comprises a frame 20 and a web 30. Referring to FIG. 2, the frame 20 is preferably made out of spring steel wire 22, also known as music wire. However, other alternative materials may be used in the construction of the frame 20, such as any flexible material or even plastic. The wire 22 dimensions are known in the art and the preferred embodiment uses spring steel wire with a diameter of 0.0915 inches and 1050–1060 carbon steel composition, although other dimensions and compositions could be used. The wire 22 is cut to predetermined lengths and its ends are connected together by a roll pin 24, such as to form an oval-shaped frame 20. The roll pin 24 is provided with a crimp 26 to better secure the ends of the wire 22.

Figure 4:
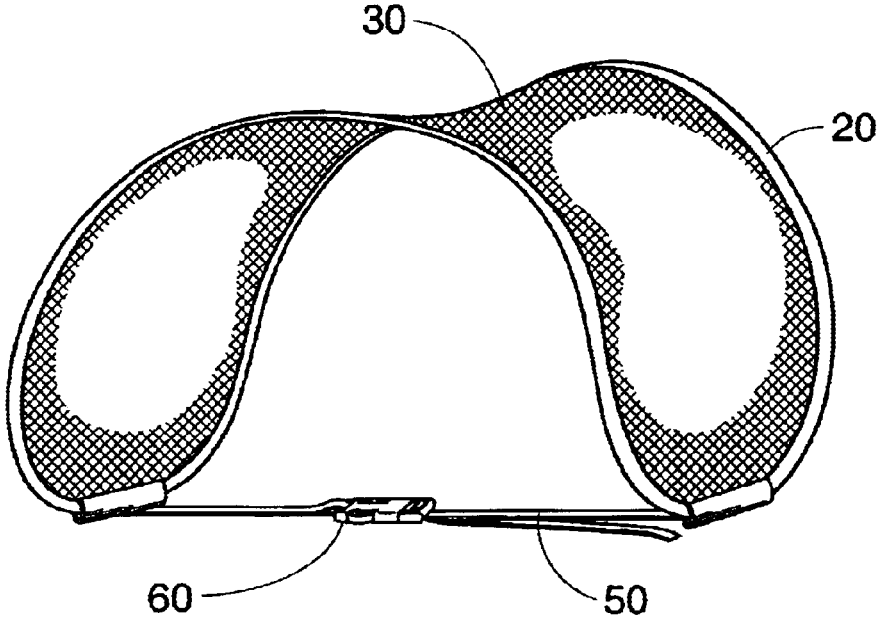
FIG. 4 is a perspective view of the invention, showing the frame and the web in a convexly arcuate position.
Figure 5:
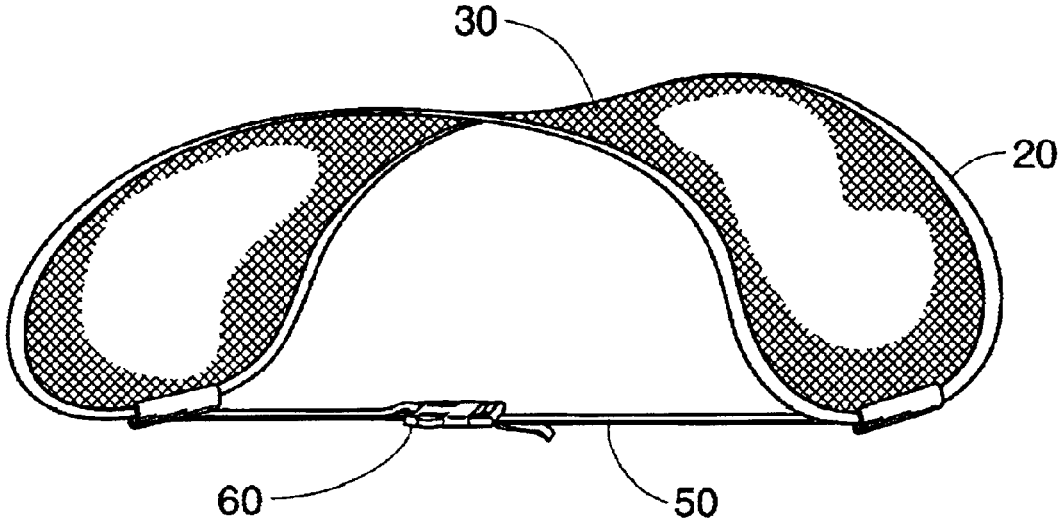
FIG. 5 is a perspective view of the invention, showing an alternate convexly arcuate position of the frame and the web.

As shown in FIG. 1, the web 30 is preferably made out of nylon mesh, although any cloth material capable of allowing water and air circulation could be used. An edging 25, made preferably, but not necessary, out of a stretch resistant material, such as nylon, envelops entirely the length of the frame 20. In the preferred embodiment, the web 30 has an oval shape and is sewn to the edging 25. As a result, in its relaxed state, the web 30 is stretched over the frame 20. FIG. 1 also shows two optional support members 40, 42 positioned diametrically opposed to one another and connected to the frame 20. The support members 40, 42 are preferably hollow cylindrical tubes designed to offer stability to the apparatus 10 during the drying process. A strap 50 has its ends 52, 54 coupled to the web 30 and includes a releasable fastener 60. The fastener 60 is fixedly attached to the strap 50 at a predetermined distance from the end 52 of the strap 50. The portion of the strap 50 situated toward the end 54 is adjustable to allow application of a variable tension to the frame 20 and the web 30. As a result, the frame 20 and the web 30 take variable convexly arcuate positions, as illustrated in FIGS. 4 and 5. The amount of tension needed depends on the weight of the item to be dried. If the garment or other item to be dried is heavy, a higher tension should be applied to the frame 20, therefore increasing the height of the frame 20 in its arcuate position. The item has then better support during the drying process. If the item is lighter, a proportionately lower tension would be necessary.

Figure 3:
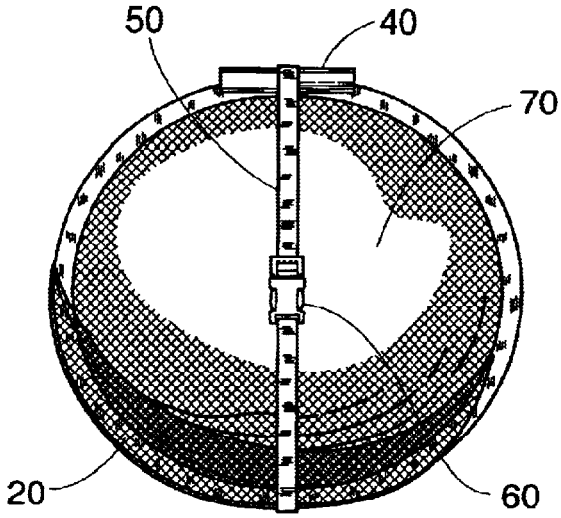
FIG. 3 is a top view of the invention, showing the frame in its collapsed state.

The fastener 60 can be disengaged at any time, after the drying process is complete, to allow collapsing of the frame 20 for storage or transportation purposes. After the releasable fastener 60 is disengaged, the apparatus 10 will take the form illustrated in FIG. 1. In order to collapse the apparatus 10, the user rotates the support members 40, 42 in opposite directions, in planes perpendicular to a plane defined by the frame 20 and the web 30. The rotation will create two circular web portions 70. Then the user biases the support members 40, 42 toward each other, thereby allowing the two web portions 70 to fold adjacently, as shown in FIG. 3. Further referring to FIG. 3, the final step requires the user to wrap the strap 50 around the frame 20 and the two adjacent web portions 70 and to engage the fastener 60, thereby securing the apparatus 10 in its collapsed state.

The foregoing is considered as illustrative only of the principles of the invention. Furthermore, since numerous modifications and changes will readily occur to those skilled in the art, it is not desired to limit the invention to the exact construction and operation shown and descried. While the preferred embodiment has been described, the details may be changed without departing from the invention, which is defined by the claims.

What is claimed is:

1. A collapsible apparatus comprising:

a *collapsible* frame for drying;

a web substantially stretched over said *collapsible* frame;

[at least one support member coupled to said frame;]

a strap having a first end and a second end;

each of said first end and said second end being coupled to said web, *whereby said collapsible frame and said web are formed in a convexly arcuate position.*

2. The apparatus of claim 1 wherein said frame is oval in shape.

3. The apparatus of claim 1, wherein said *strap* further comprises a releasable fastener located a predetermined distance from said first end of said strap.

[4. The apparatus of claim 3, wherein a pair of diametrically opposed support members are coupled to said frame.]

5. The apparatus of claim [4] *3*, wherein said frame may be folded in a collapsed state by disengaging said fastener and by rotating said [support members] *frame* in opposite directions.

6. The apparatus of claim 5, wherein a pair of circular web portions is formed from said frame.

7. The apparatus of claim 6, wherein said [support members] *circular web portions* are biased toward each other, thereby folding adjacently said circular web portions.

8. The apparatus of claim 7, wherein said strap secures said frame in said collapsed state by engaging said fastener.

9. The apparatus of claim 1, wherein said web comprises a fabric material.

10. The apparatus of claim 1, wherein said strap has an adjustable length.

11. The apparatus of claim 10, wherein said frame is biased by said strap in to a convexly arcuate condition.

12. A method for folding a collapsible drying apparatus comprising a web substantially stretched over a frame, said frame having an expanded state and a collapsed state, [two opposing support members coupled to said frame,] a strap having two ends, each end being coupled to said web, and a releasable fastener coupled to said strap, said method comprising the steps of:

disengaging said releasable fastener attached to said drying apparatus;

rotating said [support members] *frame* in opposite directions *wherein a pair of circular web portions is formed from said frame*;

biasing said [support members] *circular web portions* toward each other; and engaging said releasable fastener.

13. The method of claim 12, said method further comprising, before engaging said releasable fastener, the step of wrapping said strap around said frame in said collapsed state.

14. A method for forming a drying apparatus, said method comprising the steps of:

securing a web around a frame for drying;

coupling opposed adjustable straps to said web;

connecting said adjustable straps by means of a releasable fastener, whereby said frame and said web are formed in a convexly arcuate position.

[15. The method of claim 14, wherein said method further comprises the step of coupling at least one support member to said frame.]

16. [The] *A* method [of claim 14, wherein said method further comprises a first step of] *for forming a drying apparatus, said method comprising the steps of:* connecting the ends of an elongated wire to form [said] *a* frame[.]*;*

*securing a web around said frame for drying;*

*coupling opposed adjustable straps to said web; and*

*connecting said adjustable straps by means of a releasable fastener, whereby said frame and said web are formed in a convexly arcuate position.*

* * * * *

UNITED STATES PATENT AND TRADEMARK OFFICE

CERTIFICATE OF CORRECTION

PATENT NO. : RE 38,591 E 
DATED : September 21, 2004
INVENTOR(S) : Michael S. Kellogg and Dean B. Krotts It is certified that error appears in the above-identified patent and that said Letters Patent is hereby corrected as shown below:

Title page,
Item [56], References Cited, U.S. PATENT DOCUMENTS, insert the following:

| | | |
|---|---|---|
| 177,749 | 3/1876 | Redden |
| 217,362 | 7/1879 | Gardner |
| 218,277 | 8/1879 | Kilham |
| 251,325 | 12/1881 | Walters |
| 414,622 | 11/1889 | Willits |
| 481,957 | 9/1892 | Klank |
| 665,942 | 1/1901 | Tabler |
| 929,430 | 7/1909 | Hill |
| 945,918 | 1/1910 | Crawford |
| 975,745 | 11/1910 | Bower |
| 1,087,702 | 2/1914 | Van Patten |
| 1,144,643 | 1/1915 | Elkins |
| 1,181,829 | 5/1916 | Bower |
| 1,206,618 | 11/1916 | F & C Thrasher |
| 1,251,560 | 1/1918 | Myskow |
| 1,263,294 | 4/1918 | Taylor |
| 1,308,268 | 7/1919 | Wagner et al. |
| 1,360,844 | 11/1920 | Williams |
| 1,394,007 | 10/1921 | Hall |
| 1,520,532 | 12/1924 | Clark |
| 1,583,083 | 5/1926 | Macaraig |
| 1,640,083 | 8/1927 | Ladd |
| 1,647,679 | 11/1927 | Williams |
| 1,703,066 | 2/1929 | Horn |
| 1,836,297 | 12/1931 | Vienna |
| 2,009,035 | 7/1935 | Towers |
| 2,042,888 | 6/1936 | Flood |
| 2,057,942 | 10/1936 | M.A.A. Fay |
| 2,071,850 | 2/1937 | Miller |
| 2,115,308 | 4/1938 | Koch |
| 2,136,761 | 11/1938 | Simmons |
| 2,280,601 | 4/1942 | Otter |
| 2,295,584 | 9/1942 | Larson |
| 2,361,743 | 10/1944 | Butler |
| 2,544,074 | 3/1951 | Ernst et al. |
| 2,600,501 | 6/1952 | Higgs |
| 2,639,819 | 5/1953 | Marks |
| 2,664,131 | 12/1953 | Miller |
| 2,721,099 | 10/1955 | Rupp |
| 2,724,537 | 11/1955 | Fehr |
| 2,767,757 | 10/1956 | Marder |
| 2,780,402 | 2/1957 | Zucker et al. |
| 2,833,460 | 5/1958 | Votolato |
| 2,879,553 | 3/1959 | Keating |
| 2,958,357 | 11/1960 | Vorgan |
| 3,014,516 | 12/1961 | Mueller |

UNITED STATES PATENT AND TRADEMARK OFFICE

CERTIFICATE OF CORRECTION

PATENT NO. : RE 38,591 E 
DATED : September 21, 2004
INVENTOR(S) : Michael S. Kellogg and Dean B. Krotts It is certified that error appears in the above-identified patent and that said Letters Patent is hereby corrected as shown below:

Title page (cont'd),

| | | |
|---|---|---|
| 3,017,117 | 1/1962 | Klinger |
| 3,061,396 | 10/1962 | Hock |
| 3,126,933 | 3/1964 | Mason et al. |
| 3,160,307 | 12/1964 | Morrison |
| 3,257,077 | 6/1966 | Corning |
| 3,260,396 | 7/1966 | Buch |
| 3,265,284 | 8/1966 | Tompkins |
| 3,310,089 | 3/1967 | Silverman |
| 3,354,924 | 11/1967 | Birrell et al. |
| 3,410,328 | 11/1968 | Hideo Sasai |
| D213,131 | 1/1969 | Hamilton |
| 3,439,865 | 4/1969 | Port et al. |
| 3,480,059 | 11/1969 | Schoening |
| D215,846 | 11/1969 | Curtin et al. |
| 3,502,091 | 3/1970 | Corbin |
| 3,583,748 | 6/1971 | Arndt |
| 3,603,367 | 9/1971 | Lehrman |
| 3,661,326 | 5/1972 | Wilson |
| 3,675,981 | 7/1972 | Mallander |
| 3,709,237 | 1/1973 | Smith |
| 3,727,786 | 4/1973 | Fausel |
| 3,732,978 | 5/1973 | Reader |
| 3,733,758 | 5,1973 | Maier et al. |
| 3,796,342 | 3/1974 | Sanders et al. |
| 3,799,384 | 3/1974 | Hurkamp |
| 3,807,421 | 4/1974 | Geiger et al. |
| 3,834,528 | 9/1974 | Pickford et al. |
| 3,843,222 | 10/1974 | Berkun |
| 3,868,155 | 2/1975 | Cherubini |
| 3,880,459 | 4/1975 | Kelley |
| 3,883,026 | 5/1975 | Selz |
| 3,893,649 | 7/1975 | Cornell et al. |
| 3,935,958 | 2/1976 | Frangos |
| 3,946,903 | 3/1976 | Parker |
| 3,955,706 | 5/1976 | Whitaker |
| 3,987,580 | 10/1976 | Ausnit |
| 4,073,105 | 2/1978 | Daugherty |
| 4,094,639 | 6/1978 | McMillan |
| 4,010,784 | 3/1977 | Nattrass et al. |
| 4,118,089 | 10/1978 | Johnson et al. |
| 4,133,149 | 1/1979 | Angress |
| 4,134,225 | 1/1979 | Welch |
| 4,165,757 | 8/1979 | Marks |
| 4,170,082 | 10/1979 | Freedman |
| 4,180,113 | 12/1979 | Liebling |

UNITED STATES PATENT AND TRADEMARK OFFICE

CERTIFICATE OF CORRECTION

PATENT NO. : RE 38,591 E
DATED : September 21, 2004
INVENTOR(S) : Michael S. Kellogg and Dean B. Krotts It is certified that error appears in the above-identified patent and that said Letters Patent is hereby corrected as shown below:

Title page (cont'd),

| | | |
|---|---|---|
| 4,195,804 | 1/1980 | Hujsak et al. |
| 4,212,130 | 7/1980 | Walker |
| 4,246,945 | 1/1981 | Sterling |
| 4,248,278 | 2/1981 | Blodgett |
| 4,248,442 | 2/1981 | Barrett |
| 4,265,261 | 5/1981 | Barker |
| 4,287,701 | 9/1981 | Washington |
| 4,299,365 | 11/1981 | Battle |
| 4,313,634 | 2/1982 | Williams |
| 4,352,457 | 10/1982 | Weick |
| 4,401,213 | 8/1983 | Lerner |
| 4,411,300 | 10/1983 | Rico |
| 4,427,110 | 1/1984 | Shaw, Jr. |
| D274,662 | 7/1984 | Fausel |
| 4,485,855 | 12/1984 | Dillingham |
| D279,249 | 6/1985 | Fausel |
| 4,580,776 | 4/1986 | Burkinshaw |
| 4,585,283 | 4/1986 | Redmon et al. |
| 4,603,432 | 7/1986 | Marino |
| 4,610,394 | 9/1986 | Bryson |
| 4,630,312 | 12/1986 | Milstein |
| 4,630,747 | 12/1986 | Chiang et al. |
| 4,635,411 | 1/1987 | Kurzen |
| D288,019 | 1/1987 | Gebhard et al. |
| 4,646,802 | 3/1987 | Basore et al. |
| D290,538 | 6/1987 | Basore |
| 4,683,927 | 8/1987 | Pyzer |
| 4,706,845 | 11/1987 | Schnurer et al. |
| 4,715,572 | 12/1987 | Robbins, III et al. |
| 4,716,918 | 1/1988 | Hayashida et al. |
| 4,728,066 | 3/1988 | Lang et al. |
| 4,730,748 | 3/1988 | Bane |
| 4,738,478 | 1/1988 | Bean, Jr. |
| 4,747,701 | 5/1988 | Perkins |
| 4,759,518 | 7/1988 | Yardas |
| 4,779,794 | 10/1988 | Moore |
| 4,781,300 | 11/1988 | Long |
| 4,783,031 | 11/1988 | Ebentheuer |
| 4,790,029 | 12/1988 | LaFleur et al. |
| 4,854,501 | 8/1989 | Ricci |
| 4,876,829 | 10/1989 | Mattick |
| 4,899,967 | 2/1990 | Johnson |
| 4,903,584 | 2/1990 | Styles |
| 4,925,102 | 5/1990 | Jones et al. |
| 4,940,200 | 7/1990 | Sawyer et al. |
| 4,946,118 | 8/1990 | Hastings |
| 4,948,077 | 8/1990 | Gonzalez |
| 4,953,815 | 9/1990 | Beymer et al. |

UNITED STATES PATENT AND TRADEMARK OFFICE

CERTIFICATE OF CORRECTION

PATENT NO. : RE 38,591 E
DATED : September 21, 2004
INVENTOR(S) : Michael S. Kellogg and Dean B. Krotts It is certified that error appears in the above-identified patent and that said Letters Patent is hereby corrected as shown below:

Title page (cont'd),

| | | |
|---|---|---|
| 4,964,859 | 10/1990 | Feldman |
| 4,989,749 | 2/1991 | Choi |
| 5,022,767 | 6/1991 | Cardulla |
| 5,027,748 | 7/1991 | Wolak |
| 5,031,793 | 7/1991 | Chen et al. |
| 5,036,999 | 8/1991 | Bitsch |
| 5,054,507 | 10/1991 | Sparks |
| 5,082,219 | 1/1992 | Blair |
| RE33,842 | 3/1992 | Ebentheuer |
| 5,118,201 | 6/1992 | Cook |
| 5,134,815 | 8/1992 | Pickett |
| 5,137,044 | 8/1992 | Brady |
| 5,143,283 | 9/1992 | Lancaster |
| 5,174,462 | 12/1992 | Hames |
| 5,195,649 | 3/1993 | Wolters |
| 5,222,513 | 6/1993 | Hilliard |
| 5,253,775 | 10/1993 | Gould |
| 5,263,672 | 11/1993 | He |
| 5,273,142 | 12/1993 | Weber |
| 5,301,705 | 4/1994 | Zheng |
| 5,324,490 | 6/1994 | Van Vlahakis et al. |
| 5,335,805 | 8/1994 | Chen |
| 5,356,024 | 10/1994 | Ho et al. |
| 5,375,267 | 12/1994 | Davis |
| 5,382,087 | 1/1995 | Pouch |
| 5,393,023 | 2/1995 | Callan |
| 5,394,897 | 3/1995 | Ritchey et al. |
| 5,411,046 | 5/1995 | Wan |
| 5,429,437 | 7/1995 | Shaw et al. |
| 5,437,384 | 8/1995 | Farrell |
| 5,437,410 | 8/1995 | Babasade |
| 5,464,113 | 11/1995 | Ho et al. |
| 5,467,794 | 11/1995 | Zheng |
| 5,468,061 | 11/1995 | Friess et al. |
| 5,474,196 | 12/1995 | Fausel et al. |
| 5,492,675 | 2/1996 | Brizard |
| 5,499,083 | 9/1995 | Dougherty et al. |
| 5,576,621 | 11/1996 | Clements |
| 5,853,313 | 12/1998 | Zheng |
| 5,593,046 | 1/1997 | Katsuura et al. |
| 5,722,446 | 3/1998 | Zheng |
| D407,765 | 4/1999 | Zheng |
| 5,746,514 | 5/1998 | Orensten |
| 5,762,530 | 6/1998 | Zheng |
| 5,778,915 | 7/1998 | Zheng |
| 5,816,954 | 10/1998 | Zheng |
| 5,827,104 | 10/1998 | Zheng |

UNITED STATES PATENT AND TRADEMARK OFFICE

CERTIFICATE OF CORRECTION

PATENT NO. : RE 38,591 E
DATED : September 21, 2004
INVENTOR(S) : Michael S. Kellogg and Dean B. Krotts It is certified that error appears in the above-identified patent and that said Letters Patent is hereby corrected as shown below:

Title page (cont'd),

| | | |
|---|---|---|
| 5,964,533 | 10/1999 | Ziglar |
| 5,967,357 | 10/1999 | Kellogg et al. |
| 5,971,188 | 10/1999 | Kellogg et al. |
| 5,992,045 | 11/1999 | Kellogg et al. |
| 5,992,676 | 11/1999 | Tsai |
| 6,059,912 | 5/2000 | Kellogg et al. |
| D431,361 | 10/2000 | Kellogg et al. |
| D 433,810 | 11/2000 | Kellogg et al. |
| D438,009 | 2/2001 | Kellogg et al. |
| 6,220,998 | 4/2001 | Kellogg et al. |

FOREIGN PATENT DOCUMENTS, insert the following:

| | | |
|---|---|---|
| 589,062 | | France |
| 1367 | 5/1871 | Britain |
| JP 6-42,227 | 2/1994 | Japan |
| FR 2,635,136 | 1990 | France |
| DE 41 14 916 | 1991 | Germany |
| DE 2,015,649 | 1971 | Germany |
| FR 1,380,729 | 1964 | France |
| DE 30 13 178 | 1980 | Germany |

OTHER PUBLICATIONS, insert the following:
-- "Magic Maaze" Frongate mail-Order Catalog, Summer 1995, pg. 32.

Playhut brochure, date unknown. --

Signed and Sealed this

Twentieth Day of December, 2005

JON W. DUDAS
*Director of the United States Patent and Trademark Office*